United States Patent
Egnor et al.

(10) Patent No.: US 8,078,601 B1
(45) Date of Patent: *Dec. 13, 2011

(54) DETERMINING UNAMBIGUOUS GEOGRAPHIC REFERENCES

(75) Inventors: Daniel Egnor, New York, NY (US); Lawrence Elias Greenfield, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 12/338,298

(22) Filed: Dec. 18, 2008

Related U.S. Application Data

(63) Continuation of application No. 11/024,977, filed on Dec. 30, 2004, now Pat. No. 7,483,881.

(51) Int. Cl.
G06F 17/30 (2006.01)
G06F 7/00 (2006.01)
(52) U.S. Cl. .......................................... 707/705
(58) Field of Classification Search ........................ None
See application file for complete search history.

(56) References Cited

U.S. PATENT DOCUMENTS

| | | | |
|---|---|---|---|
| 2002/0156779 A1 | 10/2002 | Elliott et al. | 707/6 |
| 2004/0139049 A1 | 7/2004 | Hancock et al. | 707/1 |
| 2005/0080786 A1 | 4/2005 | Fish et al. | 707/10 |
| 2006/0085392 A1 | 4/2006 | Wang et al. | 707/3 |
| 2006/0235816 A1 | 10/2006 | Yang et al. | |
| 2009/0089254 A1* | 4/2009 | Von Kaenel et al. | 707/3 |

FOREIGN PATENT DOCUMENTS

| | | |
|---|---|---|
| JP | 2001-296888 A | 10/2001 |
| JP | 2002-024264 A | 1/2002 |
| JP | 2002-041533 A | 2/2002 |
| JP | 2002-082943 A | 3/2002 |
| JP | 2002-132791 A | 5/2002 |
| JP | 2004-206476 A | 7/2004 |
| KR | 1020040079879 | 9/2004 |
| KR | 1020040086626 | 10/2004 |
| WO | WO 01/40968 A2 | 6/2001 |
| WO | WO 2004/013776 A1 | 2/2004 |

OTHER PUBLICATIONS

Takeshi Sagara et al., "Spatial Content Retrieval with Geoparsing Web Documents", Jun. 18, 2004, 8 pages. (English abstract).
Co-pending U.S. Appl. No. 11/024,977, filed Dec. 30, 2004; entitled: "Location Extraction"; 41 page specification; 15 sheets of drawings.
Co-pending U.S. Appl. No. 11/024,785, filed Dec. 30, 2004; entitled: "Classification of Abmiguous Geographic References"; 27 page specification; 12 sheets of drawings.
International Search Report for corresponding PCT application with a mailing date of May 17, 2006; 3 pages.
Bruno Pouliquen et al.; "Geographical Information Recognition and Visualisation in Texts Written in Various Languages"; Proceedings of the ACM Symposium on Applied Computing; Mar. 14, 2004; pp. 1051-1058.

* cited by examiner

*Primary Examiner* — Uyen T. Le
(74) *Attorney, Agent, or Firm* — Harrity & Harrity, LLP

(57) ABSTRACT

A system receives a search query that includes a set of search terms, determines whether at least one of the search terms corresponds to the name of a geographic area, and determines whether the geographic area corresponds to an unambiguous geographic area when at least one of the search terms corresponds to the name of the geographic area. The system performs a local search, based on one or more of the search terms, to identify documents associated with the geographic area when the geographic area corresponds to an unambiguous geographic area.

20 Claims, 15 Drawing Sheets

DETERMINING UNAMBIGUOUS GEOGRAPHIC REFERENCES

CROSS-REFERENCE TO RELATED APPLICATIONS

This application is a continuation of prior U.S. patent application Ser. No. 11/024,977, filed Dec. 30, 2004, entitled "LOCATION EXTRACTION", now U.S. Pat. No. 7,483,881 B2, issued Jan. 27, 2009, the disclosure of which is hereby incorporated by reference herein.

BACKGROUND

1. Field of the Invention

Implementations described herein relate generally to information retrieval and, more particularly, to the identification of a geographic reference in a search query to assist in local searching.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links.

Local search engines are search engines that attempt to return relevant web pages and/or business listings within a specific geographic area. For a local search, a user may enter a search query and specify a geographic area near which the search query is to be performed. The local search engine may return relevant results, such as relevant web pages pertaining to the geographic area or listings of businesses in the geographic area, to the user.

SUMMARY

According to one aspect, a method may include receiving a search query that includes a set of search terms, determining whether at least one of the search terms corresponds to the name of a geographic area, and determining whether the geographic area corresponds to an unambiguous geographic area when at least one of the search terms corresponds to the name of the geographic area. The method may also include performing a local search, based on one or more of the search terms, to identify documents associated with the geographic area when the geographic area corresponds to an unambiguous geographic area.

According to another aspect, a method may include receiving a search query that includes a set of search terms, determining whether at least one of the search terms corresponds to the name of a geographic area, and determining whether the geographic area corresponds to an unambiguous geographic area when at least one of the search terms corresponds to the name of the geographic area. The method may also include presenting an advertisement associated with a business located near or within the geographic area when the geographic area corresponds to an unambiguous geographic area.

According to yet another aspect, a computer-readable medium may store computer-executed instructions, including instructions for performing a first web search based on the name of a city in a list of cities to identify a first set of search results, instructions for counting the number of the first set of search results, instructions for performing a second web search based on the name of the city and the name of a state in which the city is located to identify a second set of search results, and instructions for counting the number of the second set of search results. The computer-readable medium may also include instructions for identifying the city as an unambiguous city when the number of the second set of search results is at least X % of the number of the first set of search results, where X is a number greater than zero.

According to a further aspect, a computer-readable medium may store computer-executable instructions, including instructions for performing a web search based on the name of a city in a list of cities to identify a set of search results, instructions for counting the number of the set of search results, and instructions for counting the number of documents in the set of search results that include postal codes associated with the city. The computer-readable medium may also include instructions for identifying the city as an unambiguous city when the number of documents in the set of search results that include postal codes associated with the city is at least X % of the number of the set of search results, where X is a number greater than zero.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Sometimes a search query is ambiguous as to whether the user desires documents associated with a local search or a regular web search. It is also sometimes unclear which geographic area the user desires for a local search. To further complicate matters, the names of some geographic areas correspond to common words (e.g., Mobile).

Figure 1:
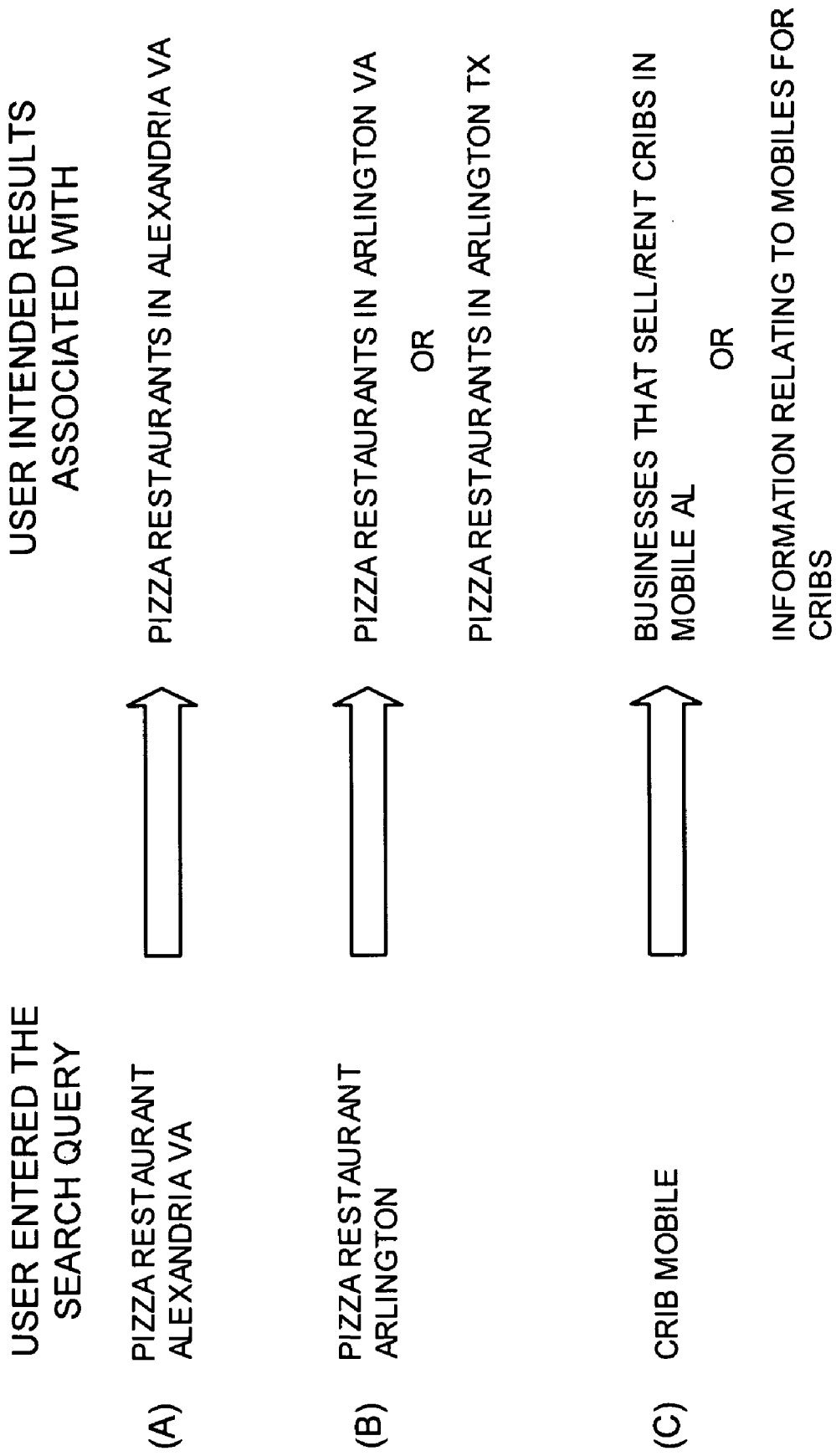
FIG. 1 is a diagram of example search queries that may include geographic references.

FIG. 1 is a diagram of example search queries that may include geographic references. In (A), the search query is relatively unambiguous—the user provided the search query "PIZZA RESTAURANT ALEXANDRIA VA." In this case, it can be assumed that the user desires local search documents relating to pizza restaurants in Alexandria, Va. In (B), the search query is more ambiguous than in (A)—the user provided the search query "PIZZA RESTAURANT ARLINGTON." In this case, it can be assumed that the user desires local search documents relating to pizza restaurants, but it may be unclear whether the user desires local search documents for Arlington, Va. or Arlington, Tex. In (C), the search query is even more ambiguous than in (A) or (B)—the user provided the search query "CRIB MOBILE." In this case, it is unclear whether the user desires local search documents or regular web search documents. For example, the user may desire local search documents relating to businesses that sell or rent cribs in Mobile, Ala. or web search documents relating to mobiles for cribs.

Systems and methods consistent with the principles of the invention may identify a geographic reference in a search query and determine whether that geographic reference should be used to retrieve local search documents.

A "document," as the term is used herein, is to be broadly interpreted to include any machine-readable and machine-storable work product. A document may include, for example, an e-mail, a web site, a business listing, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
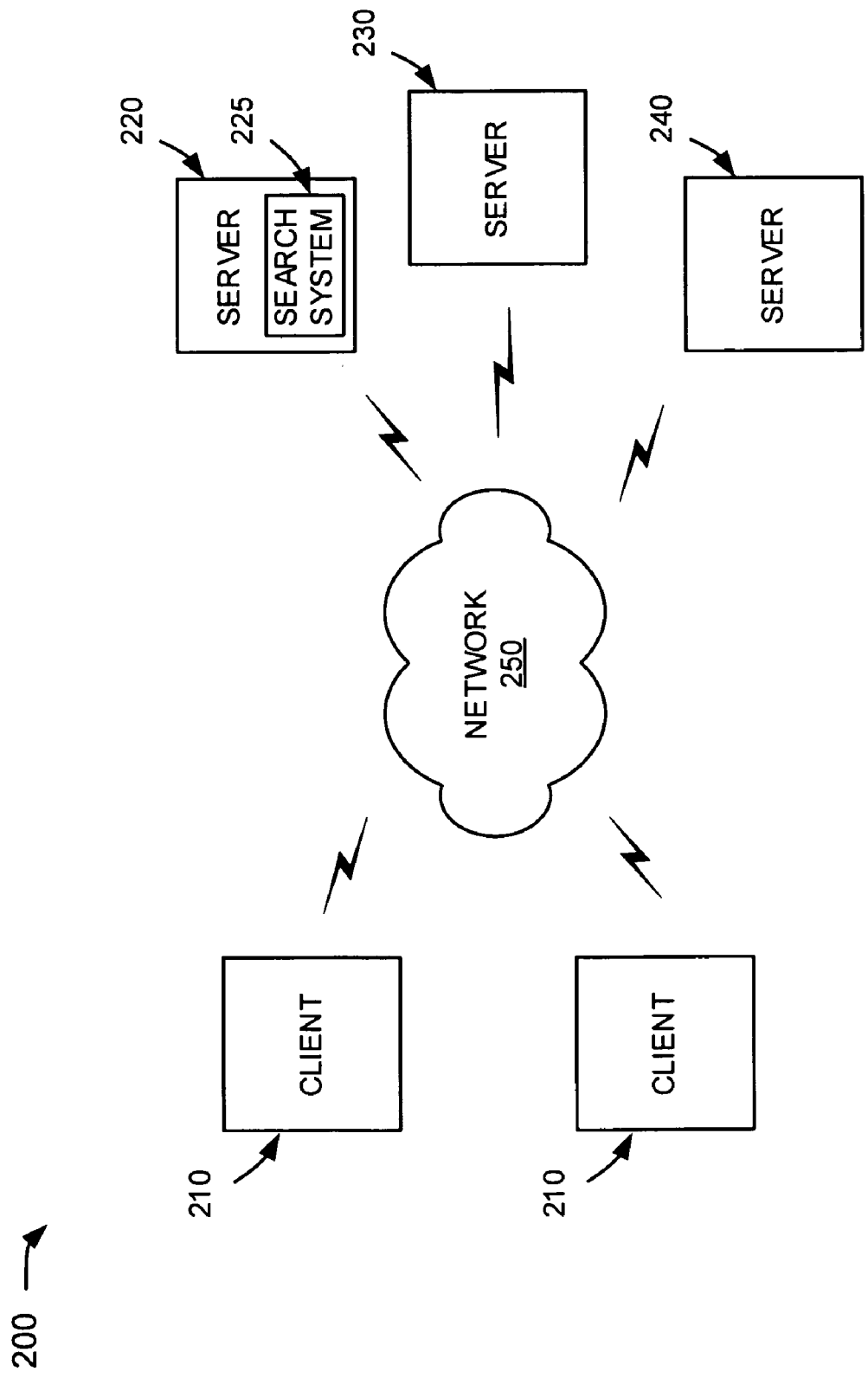
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search system 225 usable by clients 210. Server 220 may crawl a corpus of documents (e.g., web documents), index the documents, and store information associated with the documents in a repository of documents. Servers 230 and 240 may store or maintain documents that may be crawled or analyzed by server 120.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, a memory device, or a combination of networks. Clients 210 and servers 220-240 may connect to network 250 via wired, wireless, and/or optical connections.

Exemplary Client/Server Architecture

Figure 3:
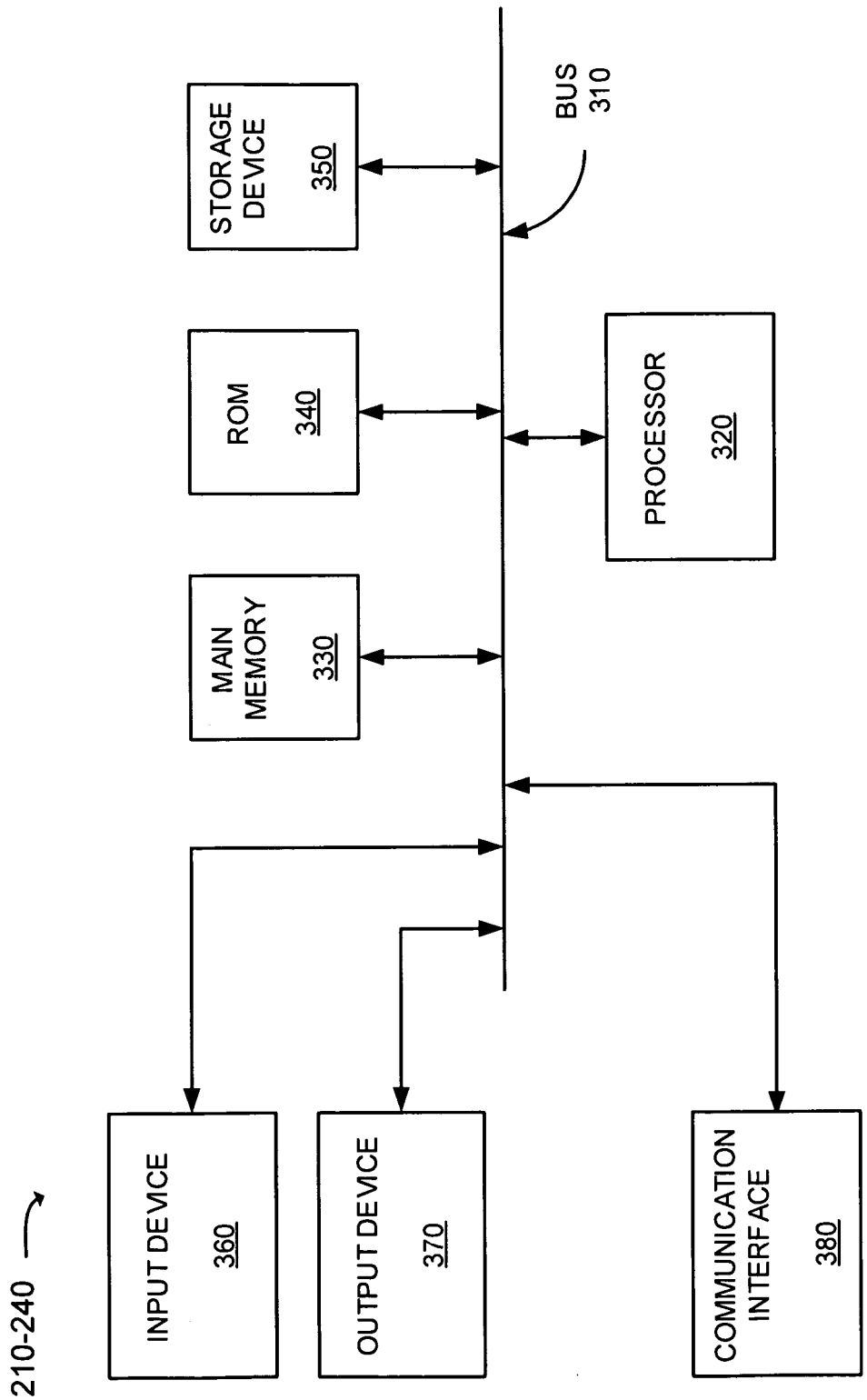
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-240, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that interprets and executes instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

The client/server entity, consistent with the principles of the invention, may perform certain operations, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Search System

Figure 4:
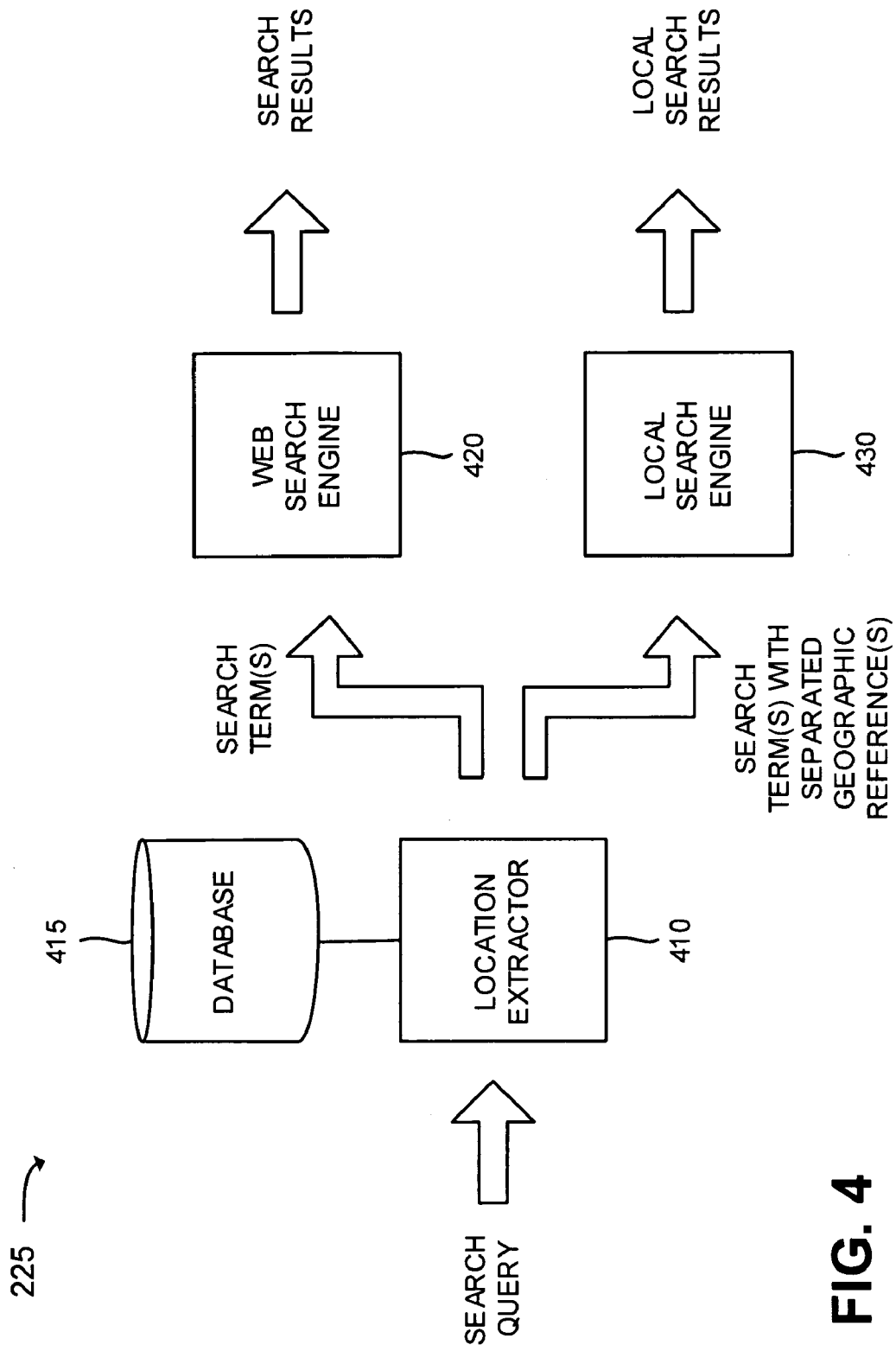
FIG. 4 is an exemplary diagram of a portion of the search system of FIG. 2 according to an implementation consistent with the principles of the invention.

FIG. 4 is an exemplary diagram of a portion of search system 225 according to an implementation consistent with the principles of the invention. The portion of search system 225 illustrated in FIG. 4 may include location extractor 410 connected to a database 415, web search engine 420, and local search engine 430. While web search engine 420 and local search engine 430 are shown as separate engines, in practice, web search engine 420 and local search engine 430 may be implemented as a single search engine. Also, location extractor 410 may be included as part of a search engine.

Database 415 may store geographic information, such as a list of geographic names (e.g., city names, state names, country names, etc.). The geographic information in database 415 may also include a list of valid postal codes (e.g., zip codes). Database 415 may also store information that interrelates the geographic information (e.g., that indicates which cities correspond to which states, which postal codes correspond to which cities, which states correspond to which countries, etc.).

Location extractor 410 may receive a search query and determine whether the search query includes a geographic reference. In one implementation, location extractor 410 may use the geographic information in database 415 to identify whether the search query contains a geographic reference. When the search query includes a geographic reference, location extractor 410 may separate the geographic reference from the search terms in the query and send them to local search engine 430. When the search query does not include a geographic reference, location extractor 410 may forward the search terms to web search engine 420.

Web search engine 420 may include a traditional web search engine that returns a set of documents related to a search query. In operation, web search engine 420 may receive the search terms of a search query from location extractor 410. Web search engine 420 may identify a set of documents that match the search query (i.e., documents that contain the set of search terms of the search query) by comparing the search terms to documents in a document corpus. Web search engine 420 might score the identified documents, sort them based on their scores, and output them as a list of search results.

Local search engine 430 may include a specialized search engine, such as a business listings search engine. In operation, local search engine 430 may receive the search terms and the geographic reference of a search query from location extractor 410. Local search engine 430 may identify a set of documents that match the search query (i.e., documents that contain the set of search terms of the search query) by comparing the search terms to documents in a document corpus relating to the geographic area associated with the geographic reference. Local search engine 430 might score the identified documents, sort them based on their scores, and output them as a list of search results.

Exemplary Processing for Identifying Unambiguous Cities

Figure 5:
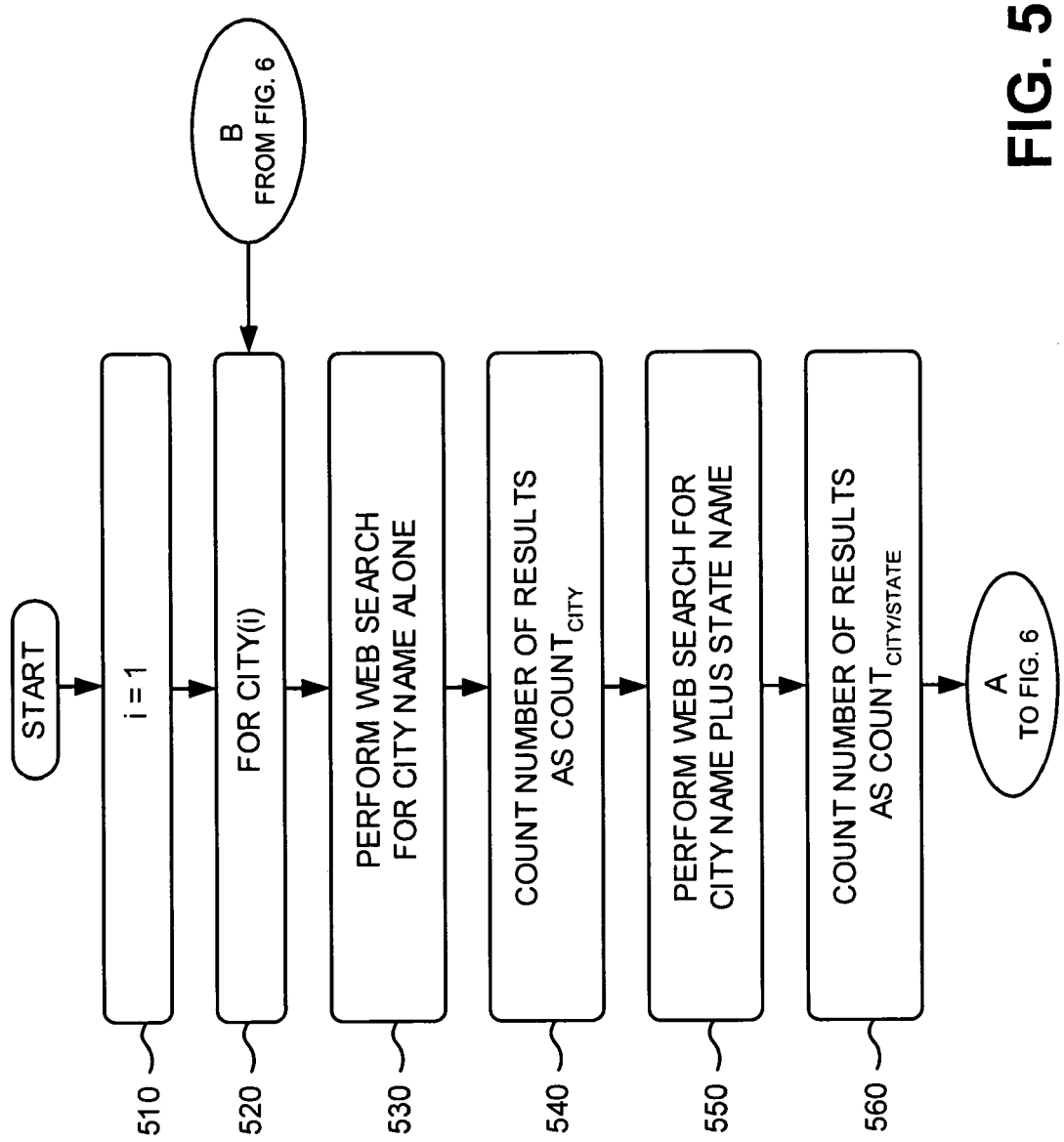
FIGS. 5 and 6 are flowcharts of exemplary processing for determining unambiguous cities according to an implementation consistent with the principles of the invention.
Figure 6:
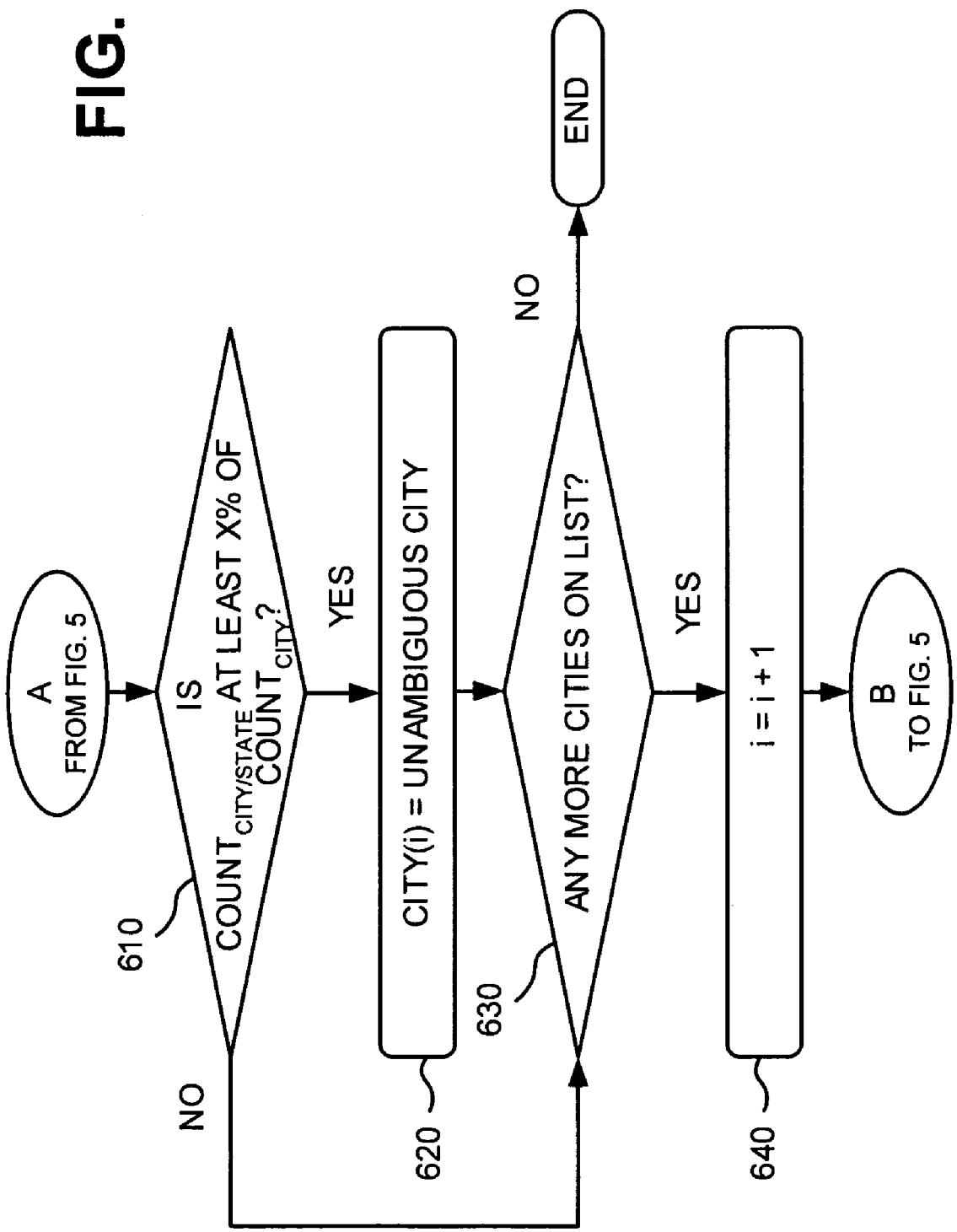

FIGS. 5 and 6 are flowcharts of exemplary processing for determining unambiguous cities according to an implementation consistent with the principles of the invention. The processing of FIGS. 5 and 6 may be performed by server 220 or a device or group of devices separate from server 220.

Processing may begin with the setting of a variable i equal to one (block 510) (FIG. 5). Then for each city(i) in the list of cities contained, for example, in database 415 (block 520), a web search may be performed for the name of the city (block 530). The number of search results for this search may be counted as $count_{city}$ (block 540). A web search may also be performed for the name of the city with the name of the corresponding state (block 550), which may be identified, for example, in database 415. The number of search results for this search may be counted as $count_{city/state}$ (block 560).

It may then be determined whether $count_{city/state}$ is at least X % (where X is a number greater than zero, such as 5) of $count_{city}$ (block 610) (FIG. 6). The theory is that when a document includes the name of a city, some fraction of the time the document will also include the name of the corresponding state (e.g., approximately 2-3% of the time). When count city/state is at least X % of $count_{city}$, then the city may be considered an "unambiguous" city (block 620). An "unambiguous city" may refer to a city whose name can be used alone in a search query and it will be understood that the user intended the city and not something else. A label may be associated with the city in database 415 to identify the city as unambiguous.

To illustrate the above processing, suppose that a web search performed for "Chicago" resulted in a $count_{city}$ of 10,000 search results. Suppose further that a web search performed for "Chicago Ill." resulted in a $count_{city/state}$ of 350 search results. If X is 5, then Chicago would not be considered an unambiguous city because $count_{city/state}$ (350) is not at least 5% of $count_{city}$ (10,000). By contrast, if the web search performed for "Chicago Ill." resulted in a $count_{city/state}$ of 550, then Chicago would be considered an unambiguous city because $count_{city/state}$ (550) is at least 5% of $count_{city}$ (10,000).

When $count_{city/state}$ is not at least X % of $count_{city}$, then it may be determined whether there are any more cities on the list (block 630). If there are more cities on the list, then the variable i may be incremented by one (block 640) and processing may return to block 520 (FIG. 5).

In some situations, there may be multiple unambiguous cities with the same name that are considered unambiguous. For example, when the above processing is performed for the city "Hollywood" in Florida, it may be determined that Hollywood, Fla. is an unambiguous city. When the above processing is performed for the city "Hollywood" in California, it may be determined that Hollywood, Calif. is also an unambiguous city. In situations like this, the city with the larger (or significantly larger) population may be labeled as an unambiguous city in database 415. Alternatively, the city with the largest $count_{city/state}$ to $count_{city}$ ratio may be labeled as an unambiguous city. Any unambiguous label already associated with any other city with the same name in database 415 may be removed.

In other situations, it may be beneficial to permit multiple cities with the same name to remain in database 415. For example, multiple cities with the same name may exist in two different countries and be determined to be unambiguous with regard to their respective country. When the above processing is performed for the city "Manchester" in New Hampshire, for example, it may be determined that Manchester, N.H. is an unambiguous city. When the above processing is performed for the city "Manchester" in England, it may be determined that Manchester, England is also an unambiguous city. In situations like this, distinctions between the cities may be made when processing a search query that includes the city name, as described below.

Figure 7:
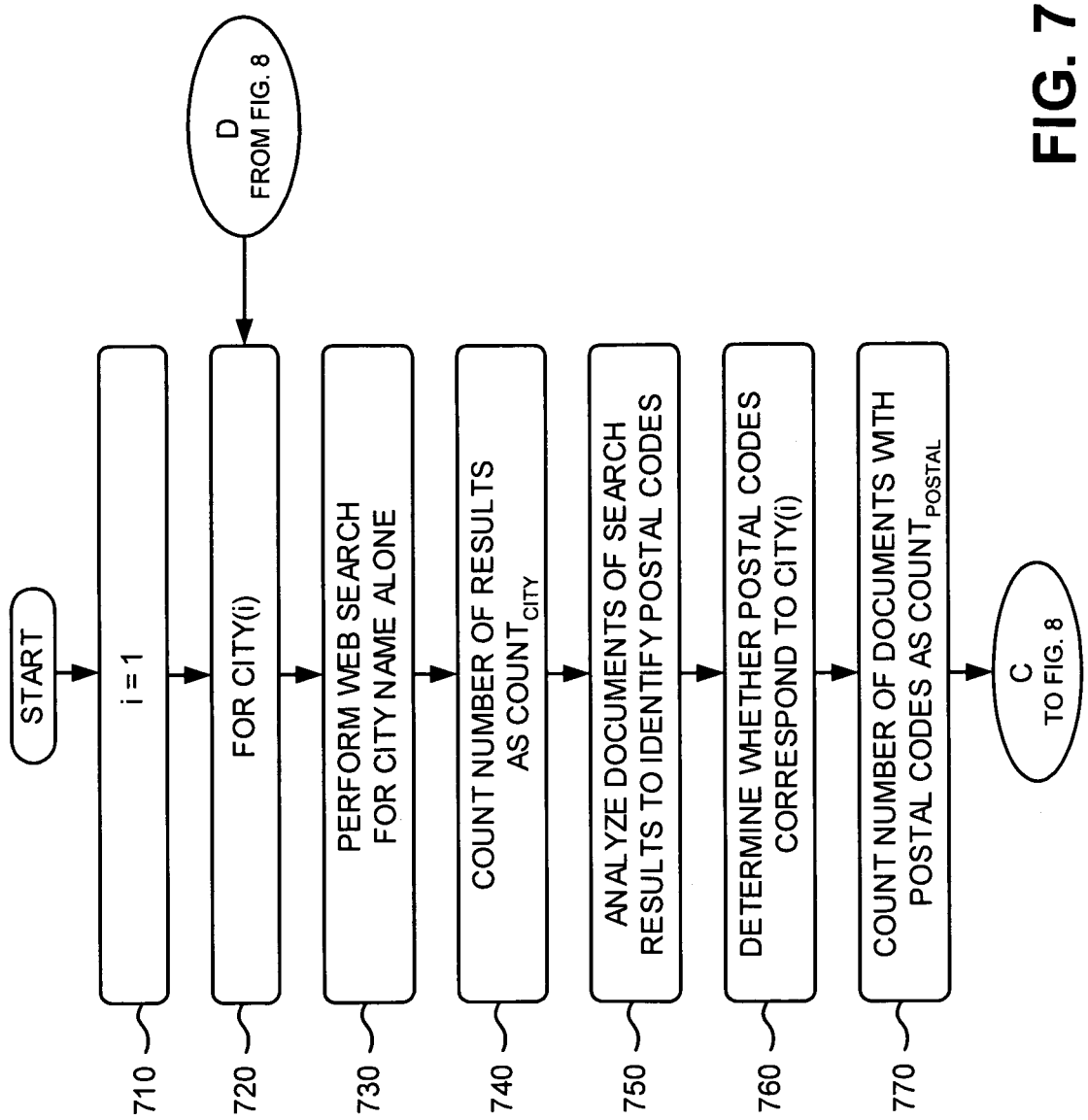
FIGS. 7 and 8 are flowcharts of exemplary processing for determining unambiguous cities according to another implementation consistent with the principles of the invention.
Figure 8:
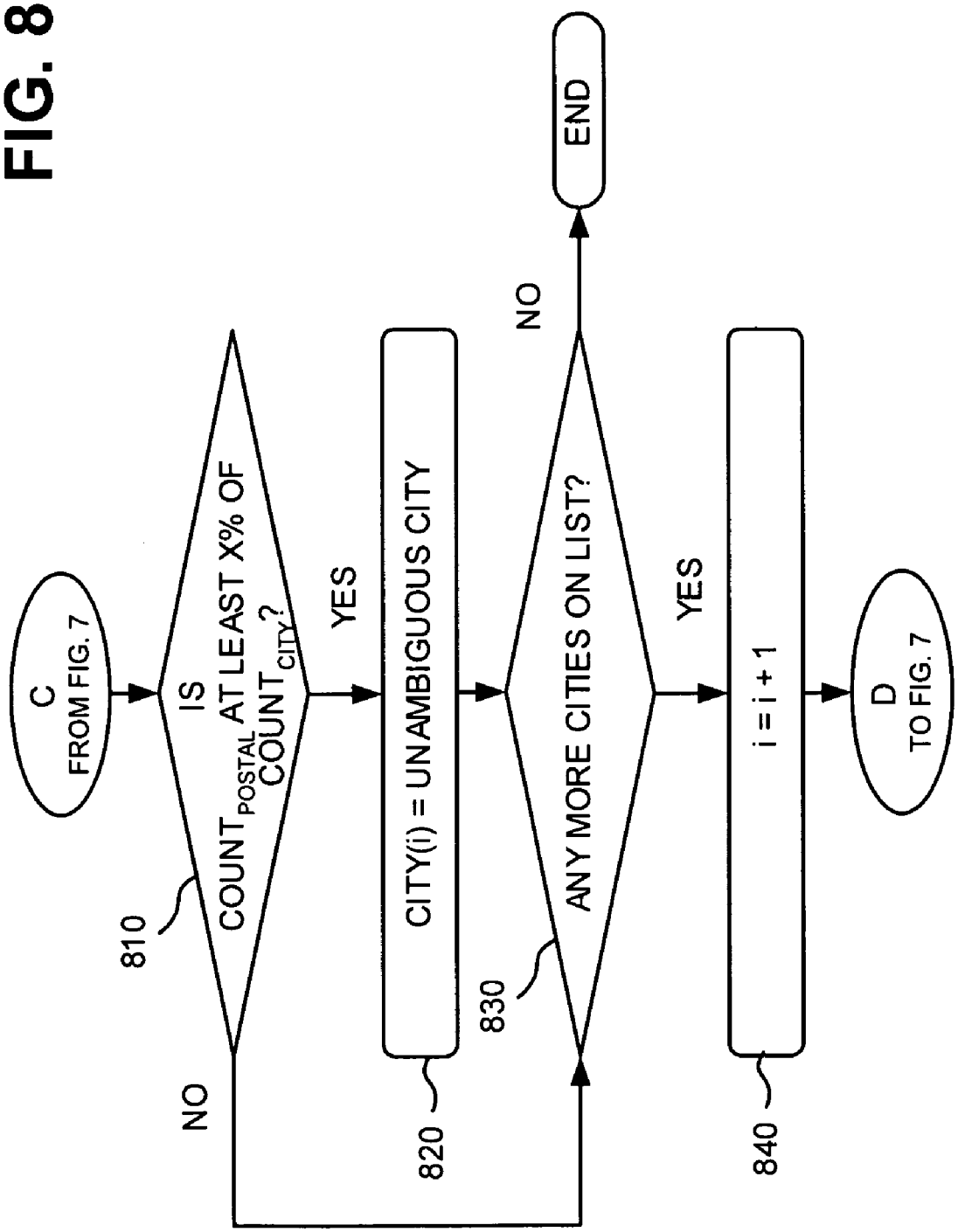

FIGS. 7 and 8 are flowcharts of exemplary processing for determining unambiguous cities according to another implementation consistent with the principles of the invention. The processing of FIGS. 7 and 8 may be performed by server 220 or a device or group of devices separate from server 220.

Processing may begin with the setting of a variable i equal to one (block 710) (FIG. 7). Then for each city(i) in the list of cities contained, for example, in database 415 (block 720), a web search may be performed for the name of the city (block 730). The number of search results for this search may be counted as $count_{city}$ (block 740).

The documents of the search results may be analyzed to identify any postal codes that they contain (block 750). The postal codes may be identified using a pattern matching technique and verified by comparing them to the list of postal codes in database 415. It may then be determined whether the postal codes correspond to postal codes associated with city (i). The number of documents that contain postal codes associated with city(i) may be counted as $count_{postal}$ (block 770). In another implementation, the value of $count_{postal}$ may be based on the ranking of the documents that contain postal codes associated with city(i). For example, the documents that contain postal codes associated with city(i) may be weighted based on their corresponding rank in the search results, where higher ranked documents may be weighted more than lower ranked documents. The weight values may then be used to determine $count_{postal}$.

It may then be determined whether $count_{postal}$ is i at least X % (e.g., 5%) of $count_{city}$ (block 810) (FIG. 8). The theory is that when a document includes the name of a city, some fraction of the time the document will also include a postal code associated with the city (e.g., approximately 2-3% of the time). When $count_{postal}$ is i at least X % of $count_{city}$, then the city may be considered an unambiguous city (block 820). A label may be associated with the city in database 415 to identify the city as unambiguous.

To illustrate the above processing, suppose that a web search performed for "Chicago" resulted in a $count_{city}$ of 10,000 search result documents. Suppose that 350 of the search result documents contained a postal code associated with the city of Chicago; therefore, $count_{postal}$ equals 350. If X is 5, then Chicago would not be considered an unambiguous city because $count_{postal}$ (350) is not at least 5% of $count_{city}$ (10,000). By contrast, if 500 or more of the search result documents contained a postal code associated with the city of Chicago (i.e., $count_{postal} \geq 500$), then Chicago would be considered an unambiguous city because $count_{postal}$ ($\geq 500$) is at least 5% of $count_{city}$ (10,000).

When $count_{postal}$ is i not at least X % of $count_{city}$, then it may be determined whether there are any more cities on the list (block 830). If there are more cities on the list, then the variable i may be incremented by one (block 840) and processing may return to block 720 (FIG. 7).

While the above processing uses postal codes, other types of geographic identifiers may alternatively be used. For example, telephone numbers may be used in alternate implementation consistent with the principles of the invention.

In some situations, there may be multiple cities with the same name that are considered unambiguous. For example, when the above processing is performed for the city "Hollywood" in Florida, it may be determined that Hollywood, Fla. is an unambiguous city. When the above processing is performed for the city "Hollywood" in California, it may also be determined that Hollywood, Calif. is also an unambiguous city. In situations like this, the city with the larger (or significantly larger) population may be labeled as an unambiguous city in database 415. Alternatively, the city with the largest $count_{postal}$ to $count_{city}$ ratio may be labeled as an unambiguous city. Any unambiguous label already associated with any other city with the same name in database 415 may be removed.

In other situations, it may be beneficial to permit multiple unambiguous cities with the same name to remain in database 415. For example, multiple cities with the same name may exist in two different countries and be determined to be unambiguous with regard to their respective country. When the above processing is performed for the city "Manchester" in New Hampshire, for example, it may be determined that Manchester, N.H. is an unambiguous city. When the above processing is performed for the city "Manchester" in England, it may be determined that Manchester, England is also an unambiguous city. In situations like this, distinctions between the cities may be made when processing a search query that includes the city name, as described below.

Exemplary Searching-Related Processing

Figure 9:
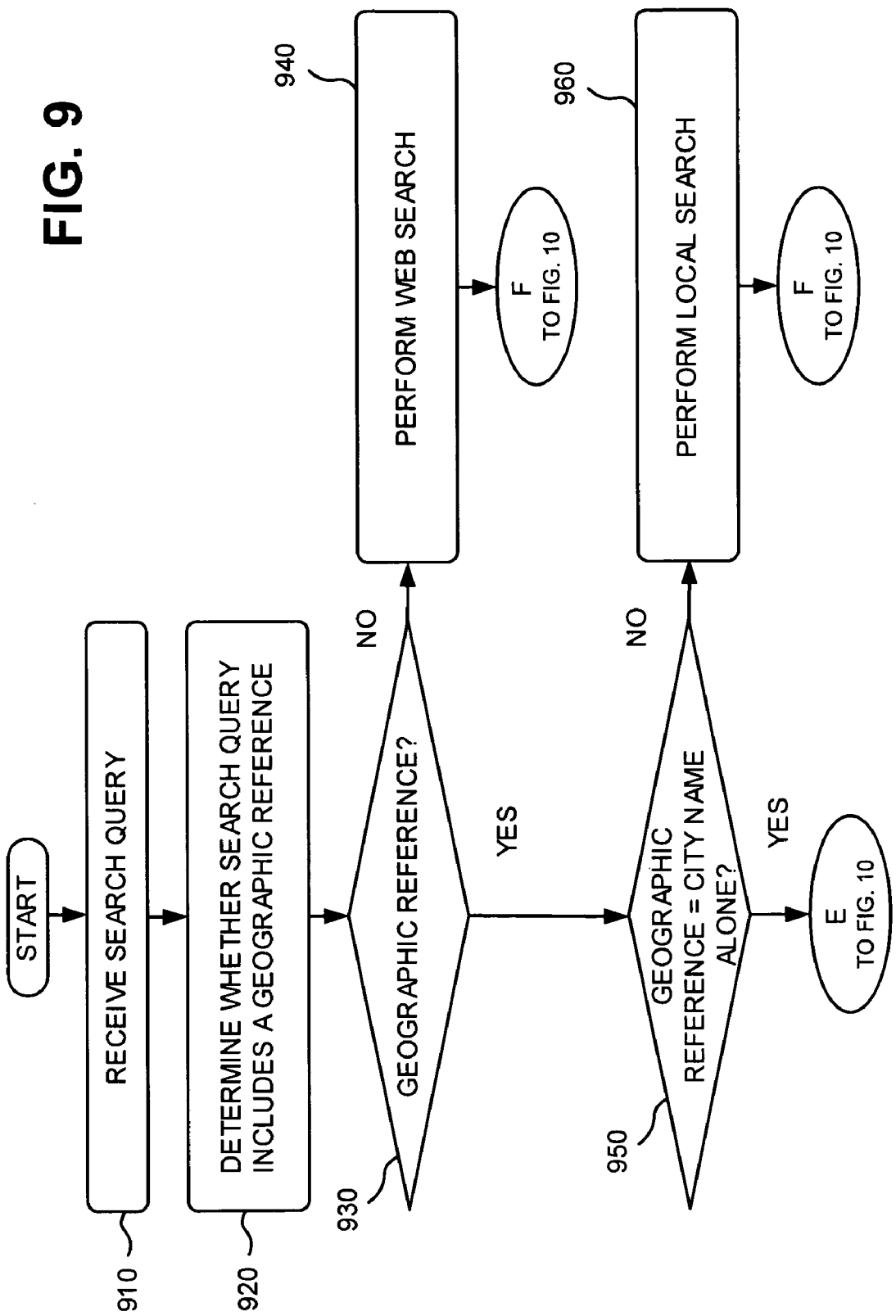
FIGS. 9 and 10 are flowcharts of exemplary processing for performing a search according to an implementation consistent with the principles of the invention.
Figure 10:
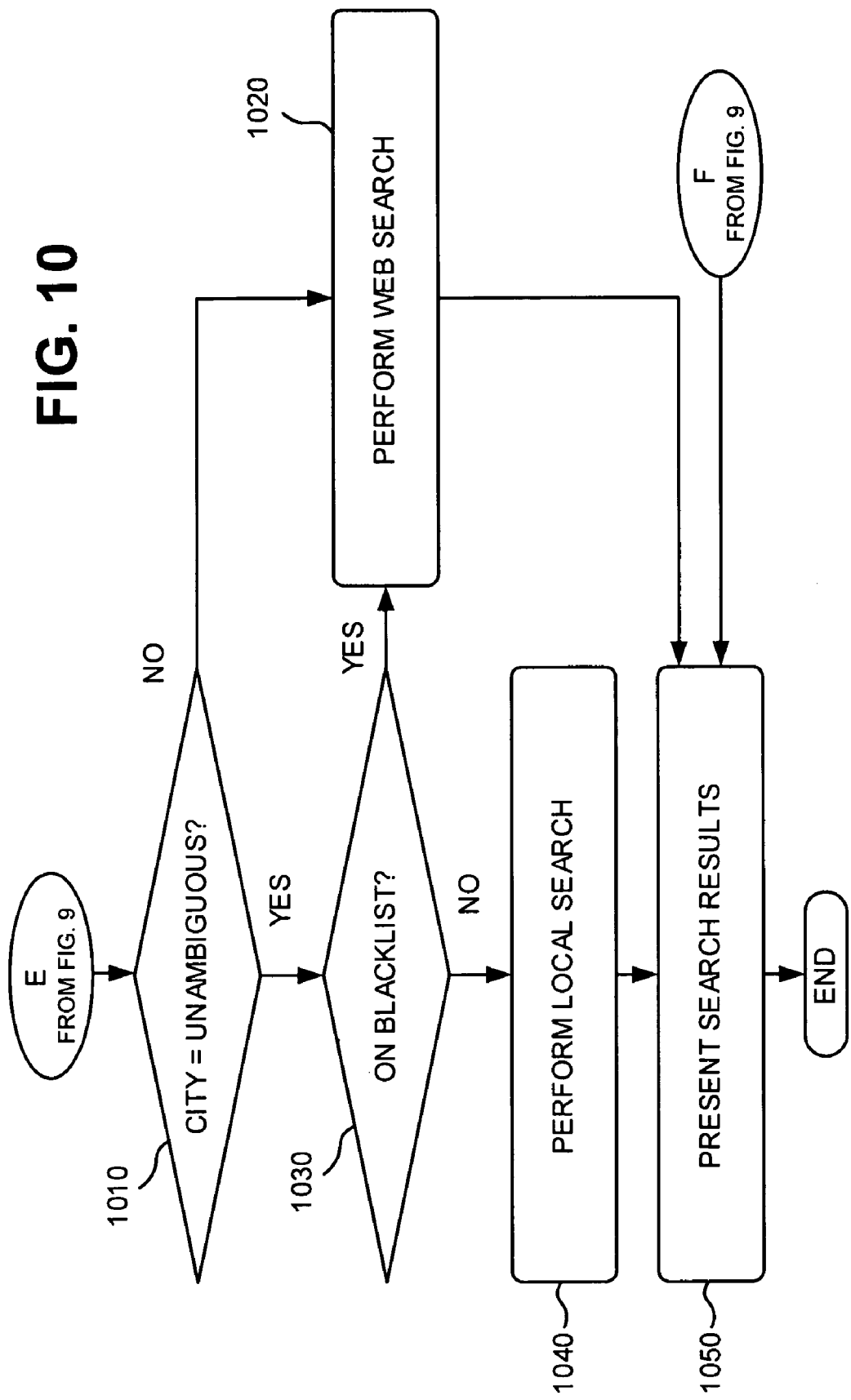

FIGS. 9 and 10 are flowcharts of exemplary processing for performing a search according to an implementation consistent with the principles of the invention. Processing may begin with server 220 receiving a search query (block 910). In one implementation, a user may use a web browser associated with a client 210 to provide the search query to server 220.

It may be determined whether the search query includes a geographic reference (block 920). In one implementation, the search query may be parsed and analyzed against a set of templates of the form: query-city-state; query-city; query-postal code; query-city-state-postal code; city-state-query; city-query; postal code-query; city-state-postal code-query; etc. A search query that includes a geographic reference may match one of these templates.

When parsing and analyzing the search query, it is possible to encounter ambiguity. For example, when a user provides the search query "pizza in New York," the user could intend a search for "pizza in New" in the city of York, Pa. or a search for "pizza" in the city of New York, N.Y. In one implementation, when there are two or more interpretations for geographical names in a search query ("New York" and "York"), the longer interpretation (i.e., "New York" rather than "York") may be selected. In addition, if multiple geographical components are included in the search query (e.g., city, state, postal code), then the interpretation that is more consistent with the other geographical components may be selected.

If the search query does not include a geographic reference, then a regular web search may be performed based on the search term(s) of the query (blocks 930 and 940). If, on the other hand, the search query includes a geographic reference, it may be determined whether the geographic reference corresponds to a city name alone (i.e., without any other geographic information, such as no state or postal code information) (block 950). If the search query includes a geographic reference other than a city name alone, then a local search may be performed based on the search term(s) of the query and the geographic reference, if the geographic reference is not ambiguous (block 960). For example, if the geographic reference includes a state name in addition to a city name or includes a postal code, then a local search may be performed based on the geographic reference. If the geographic reference includes a state name alone, then the geographic reference may be considered ambiguous. In this case, a regular web search may be performed based on the search term(s) of the query.

If the search query includes a geographic reference corresponding to a city name alone, then it may be determined whether the city corresponds to an unambiguous city (block 1010) (FIG. 10). As explained above, an unambiguous city may include an appropriate label in database 415. If the city does not correspond to an unambiguous city, then a regular web search may be performed based on the search term(s) of the query (block 1020).

If the city corresponds to an unambiguous city, then it may be determined whether the city name together with one or more other search terms of the query appear on a blacklist (block 1030). In one implementation, a blacklist may be maintained for unambiguous city names that, when combined with one or more other words, mean something other than their respective cities. For example, assume that the city of Orlando, Fla. is an unambiguous city. When Orlando appears in a search query with the word Bloom, however, the user likely desires information associated with the actor "Orlando Bloom" and not information concerning flower shops in the city of Orlando. If the city name together with one or more other search terms of the query appear on the blacklist, then a regular web search may be performed based on the search term(s) of the query (block 1020).

If the city name together with one or more other search terms of the query does not appear on the blacklist, then a local search may be performed based on the search term(s) and the geographic reference of the query (block 1040). In some situations, there may be multiple cities with the same name that are located in the same state (e.g., there are two Mountain Views in California). In situations like this, the city with the larger (or significantly larger) population may be identified as the city that the user intended. Alternatively, the user's Internet Protocol (IP) address (or another indicator of the user's location) may be used to identify where the user is located, as is known in the art, and select one of the cities based on this determination. In other situations, there may be multiple cities with the same name that are located in different countries (e.g., Manchester, N.H. and Manchester, England) and were identified as unambiguous, as described above. In these situations, the user's IP address (or another indicator of the user's location) may be used to identify where the user is located, as is known in the art, and select one of the cities based on this determination.

Search results, either web or local, may be formed based on the web or local search. For example, the documents identified based on the search may be scored and sorted based on their scores. The search results may then be presented to the user via client 210 (block 1050).

It may be possible as a result of the city not corresponding to an unambiguous city (block 1010) or the city name with one or more other search terms of the query appearing on the blacklist (block 1030) to suggest a local search. For example, in addition to presenting the web search results, a link to local search results may be presented. If the link is selected, a local search may be performed. If two or more cities are equally appealing for the local search, then two or more local search links may be presented. For example, if the search query contained the word "Hollywood" and either Hollywood did not correspond to an unambiguous city or Hollywood appeared on the blacklist with another word in the query, then a local search link may be presented for a local search associated with Hollywood, Calif. and another local search link may be presented for a local search associated with Hollywood, Fla.

Exemplary Advertisement-Related Processing

Figure 11:
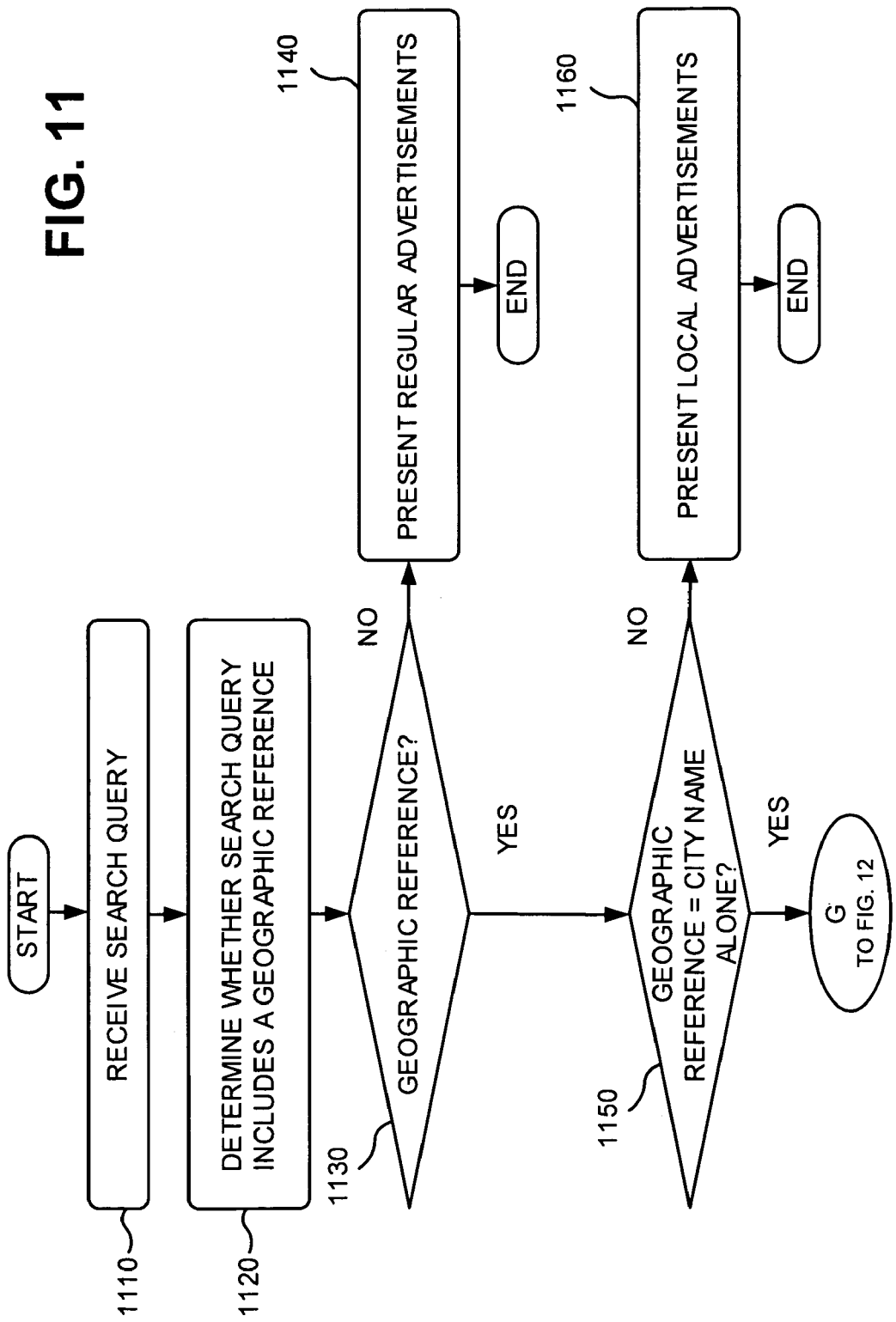
FIGS. 11 and 12 are flowcharts of exemplary processing for presenting advertisements according to an implementation consistent with the principles of the invention.
Figure 12:
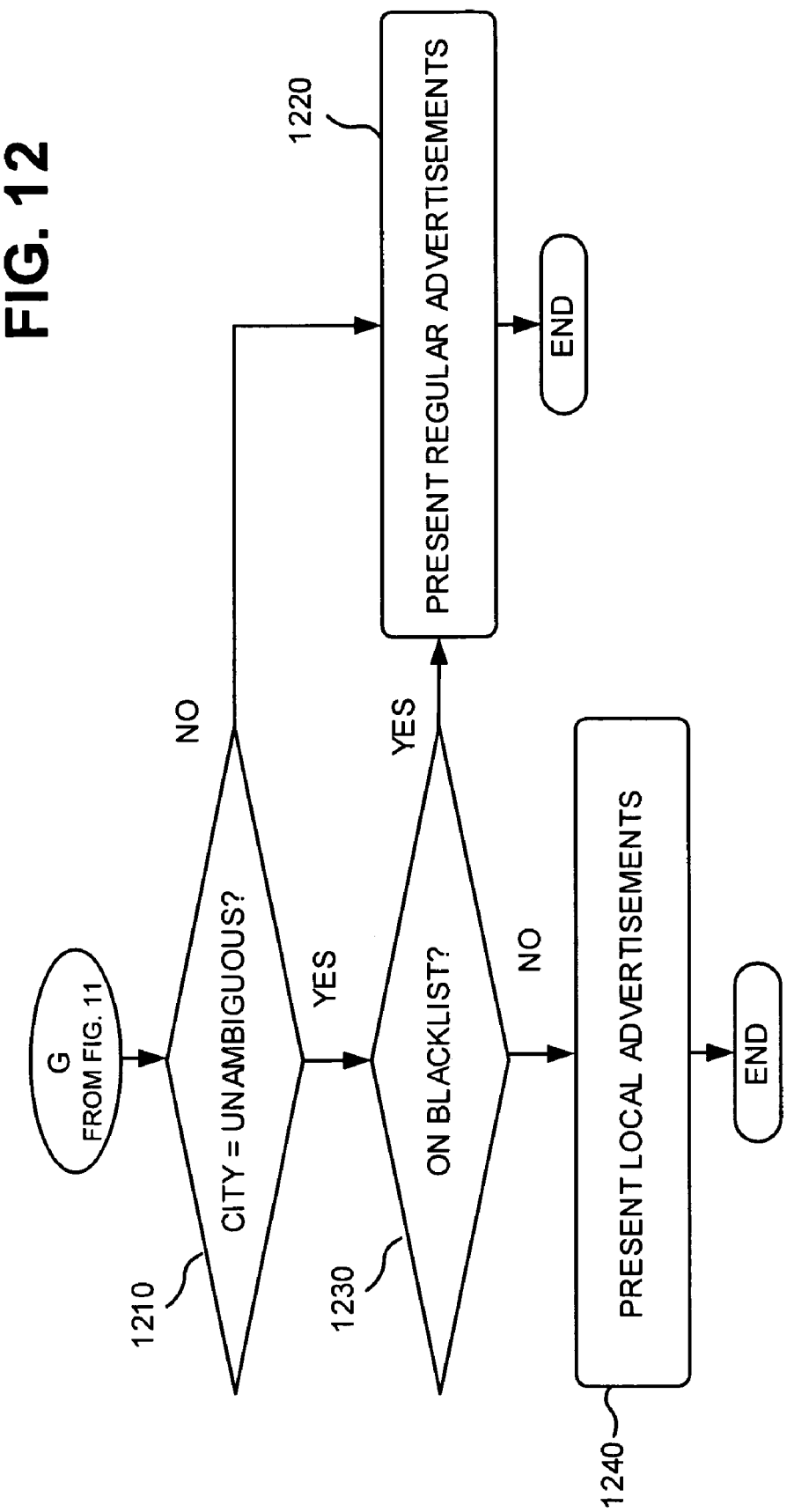

FIGS. 11 and 12 are flowcharts of exemplary processing for presenting advertisements according to an implementation consistent with the principles of the invention. Processing may begin with server 220 receiving a search query (block 1110). In one implementation, a user may use a web browser associated with a client 210 to provide the search query to server 220.

It may be determined whether the search query includes a geographic reference (block 1120). In one implementation, the search query may be analyzed against a set of templates, as described above. A search query that includes a geographic reference may match one of these templates.

If the search query does not include a geographic reference, then regular advertisements may be presented (blocks 1130 and 1140). Many techniques are known in the art for selecting advertisements to present in relation to a search query. In another implementation, it may be determined whether an indicator of the user's location, such as the user's IP address, is available. When an indicator of the user's location is available, then local advertisements may be presented, as known in the art, based on the user's location.

If, on the other hand, the search query includes a geographic reference, it may be determined whether the geographic reference corresponds to a city name alone (i.e., without any other geographic information, such as no state or postal code information) (block 1150). If the search query includes a geographic reference other than a city name alone, then local advertisements may be presented, as known in the art, if the geographic reference is not ambiguous (block 1160). For example, if the geographic reference includes a state name in addition to a city name or includes a postal code, then local advertisements may be presented based on the geographic reference. If the geographic reference includes a state name alone, then the geographic reference may be considered ambiguous. In this case, regular advertisements may be presented.

If the search query includes a geographic reference corresponding to a city name alone, then it may be determined whether the city corresponds to an unambiguous city (block 1210) (FIG. 12). As explained above, an unambiguous city may include an appropriate label in database 415. If the city does not correspond to an unambiguous city, then regular advertisements may be presented (block 1220).

If the city corresponds to an unambiguous city, then it may be determined whether the city name with one or more other search terms of the query appear on a blacklist (block 1230). As explained above, a blacklist may be maintained for unambiguous city names that, when combined with one or more words, mean something other than their respective cities. If the city name with one or more other search terms of the query appear on the blacklist, then regular advertisements may be presented (block 1220).

If the city name with one or more other search terms of the query does not appear on the blacklist, then local advertisements may be presented based on the geographic reference of the query (block 1240). In some situations, there may be multiple cities with the same name that are located in the same state (e.g., there are two Mountain Views in California). In situations like this, the city with the larger (or significantly larger) population may be identified as the city that the user intended. Alternatively, the user's IP address (or another indicator of the user's location) may be used to identify where the user is located, as is known in the art, and select one of the cities based on this determination. In other situations, there may be multiple cities with the same name that are located in different countries (e.g., Manchester, N.H. and Manchester, England) and were identified as unambiguous, as described above. In these situations, the user's IP address (or another indicator of the user's location) may be used to identify where the user is located, as is known in the art, and select one of the cities based on this determination.

When presenting local ("targeted") advertisements, information concerning the user's location, such as the user's IP address, may be used to determine whether that location is within a predetermined distance (e.g., 500 miles) of the location corresponding to the geographic reference. When the user's location is within the predetermined distance, then local advertisements may be presented. When the user's location is outside the predetermined distance, however, then regular advertisements may be presented.

Example

Figure 13:
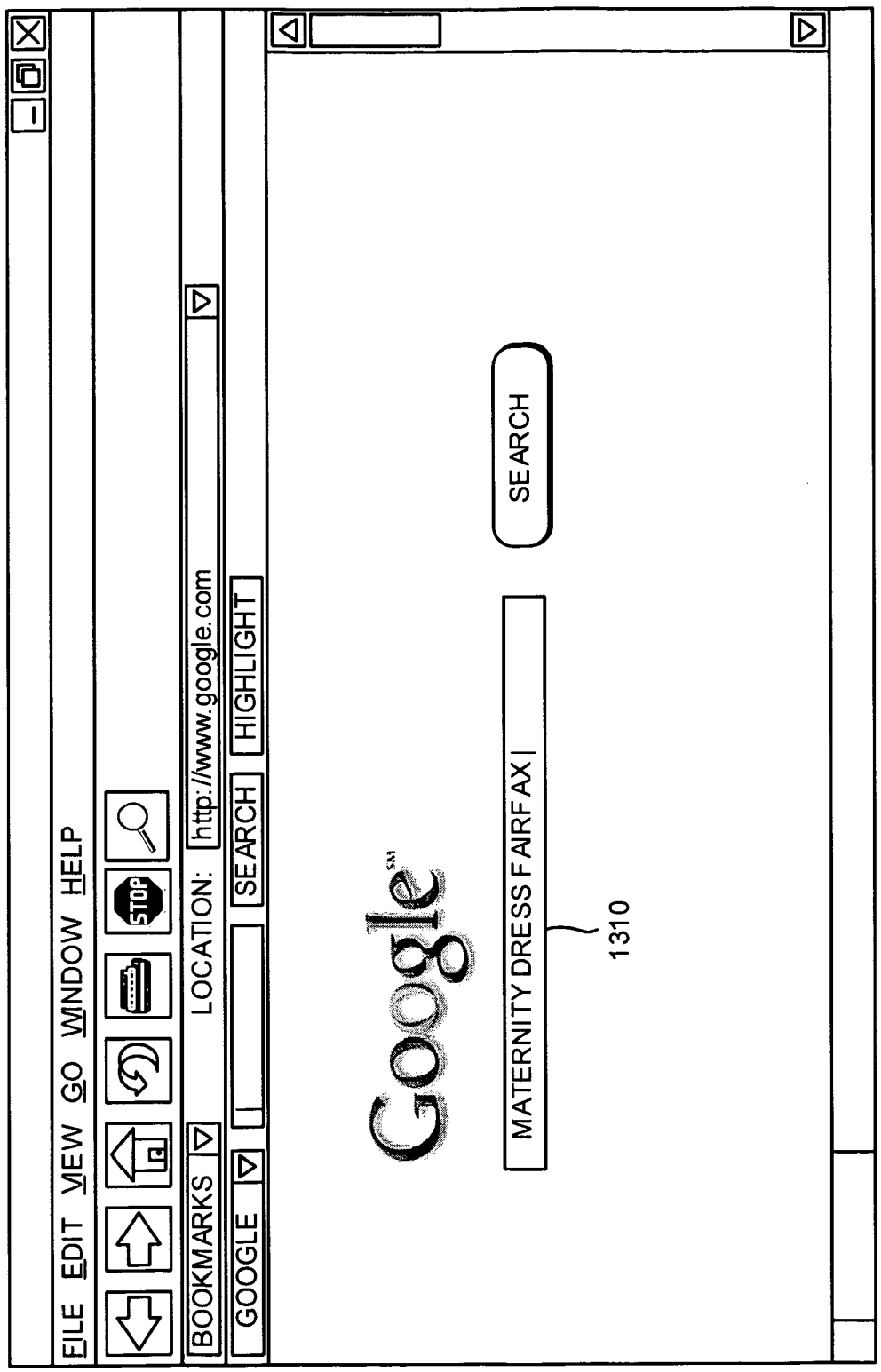
FIGS. 13-15 are exemplary diagrams of user interfaces that may be presented to a user according to an implementation consistent with the principles of the invention.
Figure 14:
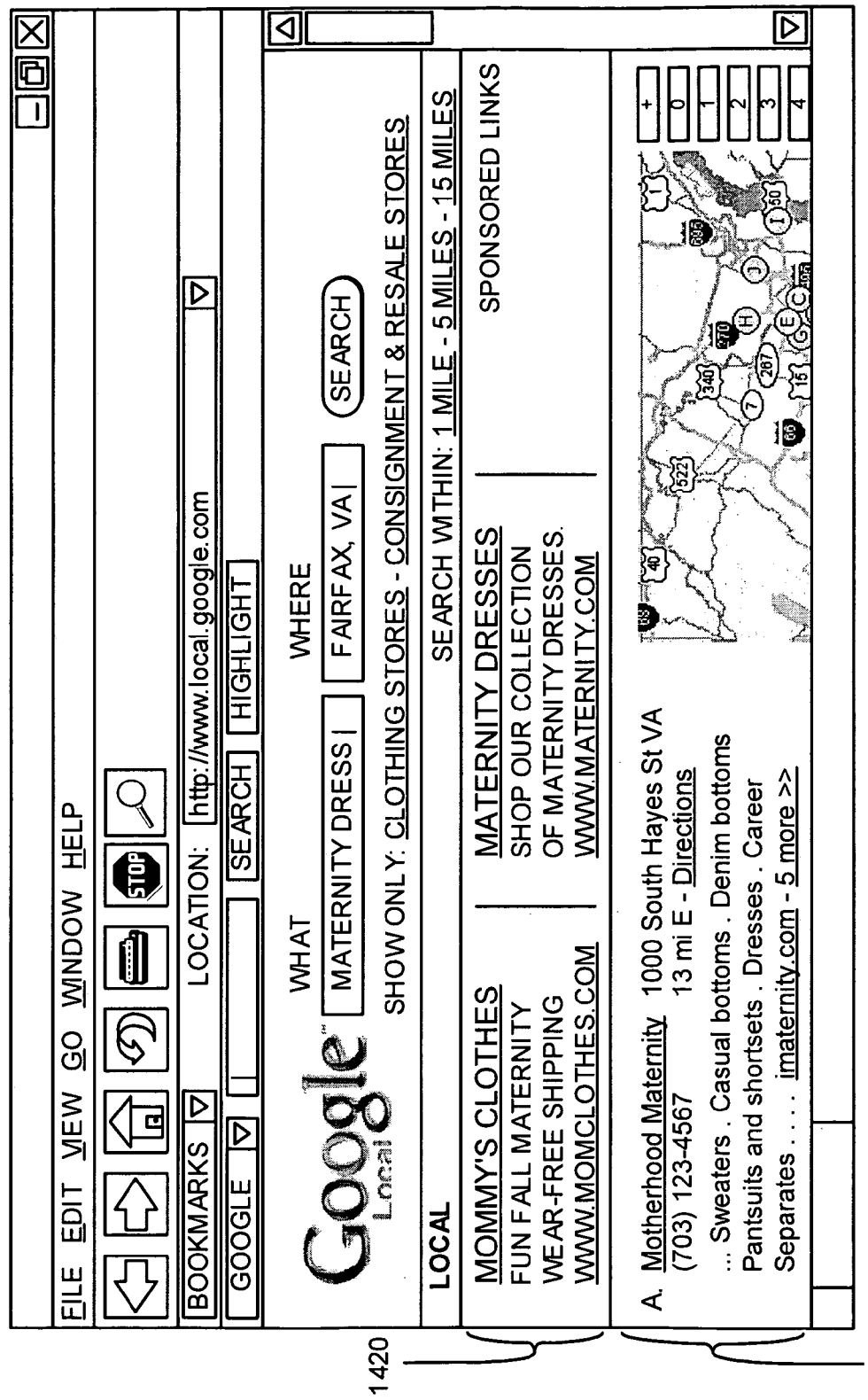
Figure 15:
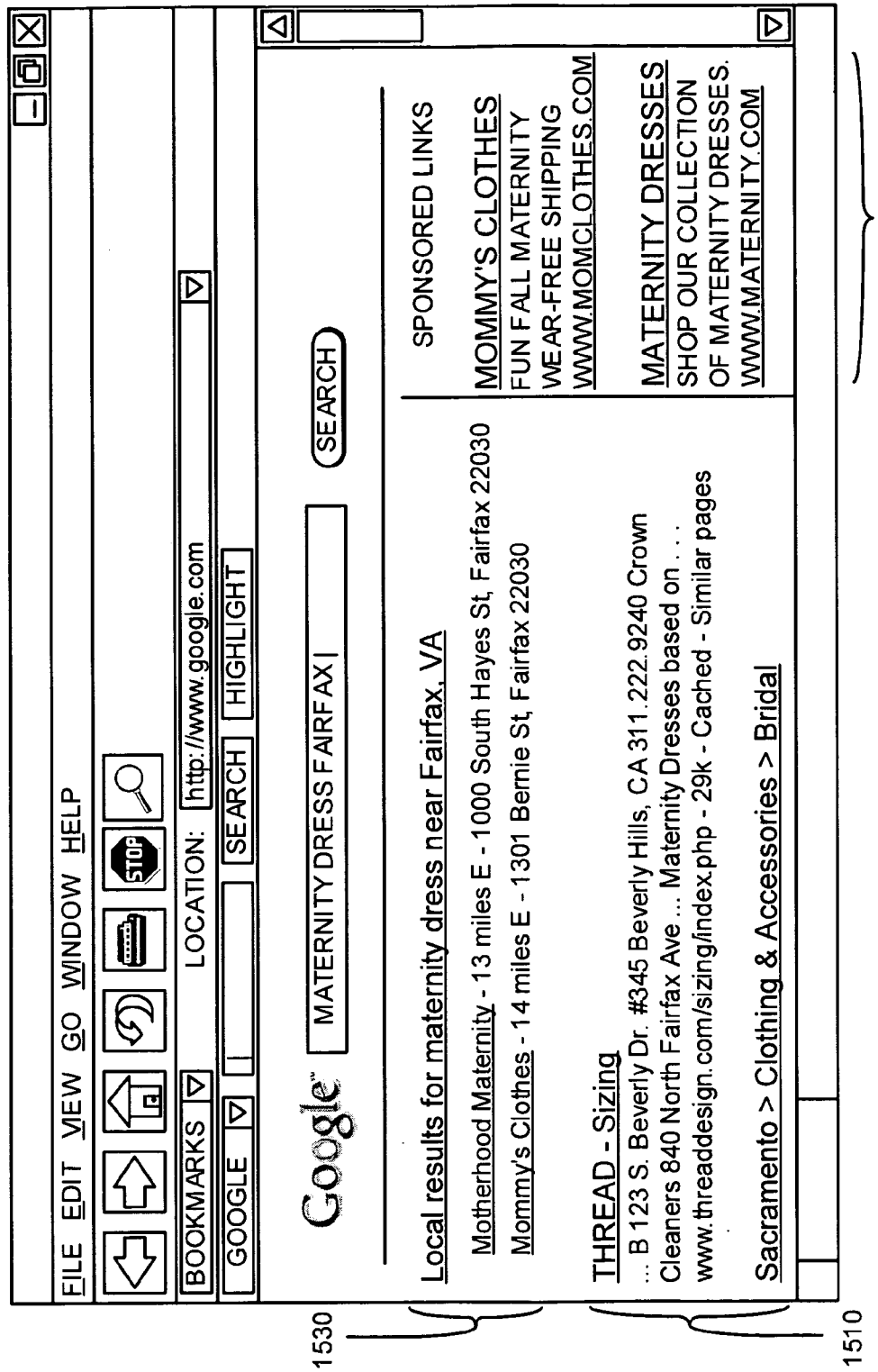

FIGS. 13-15 are exemplary diagrams of user interfaces that may be presented to a user according to an implementation consistent with the principles of the invention. Assume that the user has accessed an interface associated with a search system, such as search system 225 (FIG. 2). As shown in FIG. 13, the user may enter one or more search terms of a search query via a single data entry field (e.g., a single search box) 1310. In this case, the user has entered the search terms "maternity dress fairfax."

As described above, the search system may perform template matching to determine whether the search query includes a geographic reference. In this case, the search system may determine that "Fairfax" corresponds to a geographic reference that corresponds to a city name alone. Initially, assume that the city of Fairfax, Va. is an unambiguous city that does not appear on a blacklist with the word "maternity" and/or the word "dress." Accordingly, the search system may perform a local search for documents relating to the search terms "maternity dress" in the Fairfax, Va. area.

As shown in FIG. 14, the search system, via a user interface, may present local search results 1410 and/or local advertisements 1420. For each document in local search results 1410 (or some subset of the documents in local search results 1410), the user interface may provide address information for the business associated with the document, a telephone number for the business, a snippet from the document or another document associated with the business, a link to more information associated with the business, a link to directions to the business, and/or a link to one or more documents that refer to the business. The user interface may also provide a map of the area covered by the search. The map may optionally include pointers to businesses associated with local search results 1410 (or some set of local search results 1410). For each local advertisement 1420, the user interface may provide a link to a document associated with the advertisement and perhaps a snippet from the document that includes one or more of the search terms.

Now assume that the city of Fairfax is not an unambiguous city or appears on a blacklist with the word "maternity" and/or the word "dress." Accordingly, the search system may perform a web search for documents relating to the search terms "maternity dress fairfax."

As shown in FIG. 15, the search system, via a user interface, may present web search results 1510, regular advertisements 1520, and optionally, a local search suggestion 1530. For each search result 1510, the user interface may provide a link to a web document and perhaps a snippet from that document that includes one or more of the search terms. For each advertisement 1520, the user interface may provide a link to a document associated with the advertisement and perhaps a snippet from the document that includes one or more of the search terms.

For local search suggestion 1530, the user interface may provide a "Local results for maternity dress near Fairfax, Va." link that may cause a local search to be performed for documents relating to one or more of the search terms "maternity dress" in the Fairfax, Va. area. For local search suggestion 1530, the user interface may also provide individual links to one or more local documents that would be identified by the local search. In one implementation, one or more links corresponding to the highest scoring document(s) in the local search results may be presented.

Degrees of Unambiguous-Ness

It has been described that an unambiguous city is identified when the number of search results corresponding to a search for the city with its corresponding state or the number of search results including postal codes associated with the city is at least X % of the number of search results for the city alone. In another implementation consistent with the principles of the invention, degrees of unambiguous-ness may be established.

For example, when, as described above, the number of search results corresponding to a search for the city with its corresponding state or the number of search results including postal codes associated with the city is at least X % (e.g., 5%) of the number of search results for the city alone, then the city may be regarded as unambiguous and a local search may be performed when it is included in a search query similar to that described above.

When, on the other hand, the number of search results corresponding to a search for the city with its corresponding state or the number of search results including postal codes associated with the city is less than X % (e.g., 5%) but greater than Y % (where Y is a number less than X, such as 3) of the number of search results for the city alone, then the city may be regarded as semi-unambiguous and a regular web search may be performed when it is included in a search query. In this case, a local search may be suggested similar to that described above with regard to FIG. 15.

When the number of search results corresponding to a search for the city with its corresponding state or the number of search results including postal codes associated with the city is less than Y % (e.g., 3%) of the number of search results for the city alone, then the city may be regarded as ambiguous and a regular web search may be performed when it is included in a search query. In this case, no local search may be performed or suggested.

CONCLUSION

Systems and methods consistent with the principles of the invention may identify a geographic reference in a search query and determine whether that geographic reference should be used to retrieve local search documents.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 5-12, the order of the acts may be modified in other implementations consistent with the principles of the invention. Further, non-dependent acts may be performed in parallel.

Also, the processing of FIGS. 5-12 has been described with regard to cities. The above processing may also be applicable to geographic areas other than cities, such as towns, counties, etc.

Further, exemplary user interfaces have been described with respect to FIGS. 13-15. In other implementations consistent with the principles of the invention, the user interfaces may include more, fewer, or different pieces of information.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A method performed by a server device, the method comprising:
   receiving, by a communication interface or an input device of the server device, a search query that includes;
   a name of a geographic area;
   identifying, by a processor of the server device, a particular collection of documents that includes the name of the geographic area;
   determining, by the processor, that the name unambiguously corresponds to a particular geographic area, the determining being based on a particular term occurring in at least a threshold percentage of documents in the particular collection of documents; and
   performing, by the processor, a local search for the particular geographic area using the search query, when the name unambiguously corresponds to the particular geographic area.

2. The method of claim 1, where the particular collection of documents comprises documents that include the name and the particular term comprises at least one of a state name, a postal code, or a telephone number.

3. The method of claim 1, further comprising:
   determining that the search query includes one or more terms in addition to the name, where the name and the one or more terms occur together on a blacklist; and
   performing a web search, when the name and the one or more terms occur together on a blacklist.

4. The method of claim 1, further comprising:
   determining that the search query includes one or more terms in addition to the name, where the name and the one or more terms do not occur together on a blacklist; and
   performing a local search, when the name and the one or more terms do not occur together on a blacklist.

5. The method of claim 1, where the name corresponds to a name of a city.

6. The method of claim 1, further comprising:
   providing an advertisement targeted for the particular geographic area, when the name unambiguously corresponds to the particular geographic area.

7. The method of claim 1, further comprising:
   determining that the search query includes more than one name of a geographic area; and
   selecting a name that includes more terms than another name, when the search query includes more than one name of a geographic area.

8. The method of claim 1, further comprising:
   determining that the name unambiguously corresponds to a first geographic area and that the name unambiguously corresponds to a second geographic area; and
   selecting the first geographic area or the second geographic area based on a first population associated with first geographic area and a second population associated with the second geographic area.

9. The method of claim 1, further comprising:
   determining that the name unambiguously corresponds to a first geographic area and that the name unambiguously corresponds to a second geographic area; and
   selecting the first geographic area or the second geographic area based on a location of a user who provided the search query.

10. The method of claim 1, further comprising:
    providing a list of local search results; and
    providing a map that depicts locations of at least some of the local search results.

11. The method of claim 1, further comprising:
    providing an advertisement targeted for the particular geographic area, when the name unambiguously corresponds to the particular geographic area and when a location, of a user that submitted the search query, is within a predetermined distance of the particular geographic area.

12. The method of claim 1, further comprising:
    determining that the name unambiguously corresponds to a first city in a first country and unambiguously corresponds to a second city in a second country;
    selecting the first city or the second city based on a location of a user that submitted the search query; and
    performing a local search of the selected city using the search query.

13. A system comprising:
    means for receiving a search query that includes one or more search terms corresponding to a name of a geographical area;
    means for determining whether to classify the one or more search terms as unambiguous, semi-ambiguous, or ambiguous, based on a percentage of documents that include the one or more search terms together with a geographic term in a particular collection of documents;

means for performing a local search using the one or more search terms, when the one or more search terms are classified as unambiguous;

means for performing a web search and suggesting a local search using the one or more search terms, when the one or more search terms are classified as semi-ambiguous; and means for performing a web search using the one or more search terms, when the one or more search terms are classified as ambiguous.

14. The system of claim 13, where the one or more search terms correspond to a name of a city and where the geographic term includes one of a name of a state, a postal code, or a telephone number.

15. The system of claim 13, where the means for determining whether to classify the one or more search terms as unambiguous, semi-ambiguous, or ambiguous comprise:

means for classifying the one or more search terms as ambiguous when the percentage is less than a first threshold;

means for classifying the one or more search terms as semi-ambiguous when the percentage is greater than or equal to the first threshold and less than a second threshold, where the second threshold is greater than the first threshold; and means for classifying the one or more search terms as unambiguous when the percentage is greater than or equal to the second threshold.

16. A memory device that stores instructions executable by at least one processor, comprising:

instructions for receiving a search query, where the search query does not include a name of a state or a postal code;

instructions for identifying one or more terms in the search query corresponding to a name of a city;

instructions for determining whether the one or more terms are associated with a label in a database, where the label identifies the one or more terms as corresponding to a particular city when the search query does not include the name of a state or the postal code;

instructions for performing a search local for the particular city using the search query, when the one or more terms is associated with the label.

17. The memory device of claim 16, where the instructions for identifying the one or more terms comprise:

instructions for parsing the search query and analyzing the search query against a set of templates, where the set of templates identify the search query as including a geographic reference;

instructions for determining whether the search query includes a first set of terms that correspond to a name of a first city and a second set of terms that correspond to a name of a second city;

instructions for selecting the first set of terms or the second set of terms.

18. The memory device of claim 17, where the instructions for selecting the first set of terms or the second set of terms include at least one of:

instructions for selecting the first set of terms or the second set of terms based on a location of a user that provided the search query;

instructions for selecting the first set of terms or the second set of terms based on a population of the first city and a population of the second city;

instructions for selecting one of the first set of terms or the second set of terms that has a greater number of terms; and instructions for selecting the first set of terms or the second set of terms based on additional geographic terms that are included in the search query, when the search query includes additional geographic terms.

19. The memory device of claim of claim 16, further comprising:

instructions for performing a web search using the one or more terms to retrieve a set of results;

instructions for counting a total number of documents in the retrieved set of results;

instructions for counting a number of documents in the retrieved set of results that include the one or more terms together with a state associated with the city; and instructions for associating a label with the one or more terms in the database when the number of documents in the retrieved set of results that include the one or more terms together with the state associated with the city is at least a threshold percentage of the total number of documents in the retrieved set of results.

20. The memory device of claim of claim 16, further comprising:

instructions for performing a web search using the one or more terms to retrieve a set of results;

instructions for counting a total number of documents in the retrieved set of results;

instructions for counting a number of documents in the retrieved set of results that include the one or more terms together with a postal code associated with the city; and instructions for associating a label with the one or more terms in the database when the number of documents in the retrieved set of results that include the one or more terms together with the postal code associated with the city is at least a threshold percentage of the total number of documents in the retrieved set of results.

* * * * *